United States Patent Office 3,559,023
Patented Jan. 26, 1971

3,559,023
DEVICE FOR IMPROVING COMMUTATION OF DIRECT CURRENT ELECTRIC MACHINES
Sergei Petrovich Kalinichenko, Ulitsa Kosiora 6, kv. 35, Kharkov, U.S.S.R.
Filed Aug. 30, 1968, Ser. No. 756,573
Int. Cl. H01r 39/46
U.S. Cl. 318—439                                   3 Claims

ABSTRACT OF THE DISCLOSURE

A D.C. motor has auxiliary poles supplied with rectified current and an inductive resistance is connected in series with the armature circuit of the motor. An auxiliary winding is arranged on the cores of the auxiliary poles and is connected in parallel with the inductive resistance and is connected accordantly with the winding of the auxiliary poles. An electrical capacitance is connected in series with the auxiliary winding to improve commutation of the motor. A pure resistance may be connected in series with the capacitance and an additional auxiliary winding on the cores of the poles may be connected in parallel with the inductive resistance and accordantly with the other auxiliary winding.

---

The present invention relates to devices for improving commutation of direct current electric machines and, more particularly, electric motors having auxiliary poles and supplied with rectified current.

Known in the art is a device for improving commutation of direct current electric machines operating under fluctuating loads, which device is provided with an inductive resistance inserted into the armature circuit, and an auxiliary winding arranged on the cores of the auxiliary poles, the auxiliary winding being shunted by the said inductive resistance.

However, the above device fails to improve commutation of electric motors supplied with pulsating rectified current.

It is well known that inadequate commutation of electric motors supplied with rectified current is conditioned by insufficient compensation of the alternating component of the reactive E.M.F. in the commutated sections of the armature winding caused by pulsation of the rectified current involved by the magnetic field of the auxiliary poles.

It is also known that inadequate commutation of direct current electric machines operating under fluctuating loads is caused primarily by the lagging of the magnetic flux of the auxiliary poles as compared with the variable current of the load.

In order to provide reliable commutation of direct current electric motors supplied with rectified current and operating under fluctuating loads it is possible to force the excitation of the auxiliary poles so as to compensate the alternating component of the reactive E.M.F., caused by pulsation of the current, as well as the unbalance E.M.F. caused by the lagging of the magnetic flux of the auxiliary poles as compared to the variable load current; for this purpose the winding of the auxiliary poles is preferably connected to a circuit including pure, inductive, and capacitor resistances.

In this case it is possible to shift the phase of the alternating component of the auxiliary poles magnetic flux and thus partly improve the compensation of the alternating component of the reactive E.M.F.

However, it is impossible to obtain full compensation of the alternating component of the reactive E.M.F. necessary for material improvement of the commutation, the amplitude of the alternating component of the magnetic flux of the auxiliary poles being insufficient for compensation of the alternating component of the reactive E.M.F.

An object of the present invention is to provide a device for improving commutation of electric motors at pulsating load current both under stable operating conditions and under fluctuating loads.

According to the invention, in case of stable operating conditions, this object is achieved by providing an electric capacitance connected in series with the auxiliary winding arranged on the cores of the auxiliary poles.

The auxiliary poles of the electric motors operating under fluctuating loads may be provided with an additional auxiliary winding arranged on their cores and connected in parallel with an inductive resistance, said additional auxiliary winding being connected accordantly with the available auxiliary winding and with the winding of the auxiliary poles.

In order to facilitate adjustment of the device a pure resistance may be connected in series with the electric capacitance.

The device produced in accordance with the invention can be used for improving commutation, of, for example, traction motors of alternating current electric locomotives equipped with rectifying units or rolling mill motors supplied with rectified current.

For a better understanding of the invention it will be further described, by way of example, with reference to the appended drawings, in which.

Figure 1:
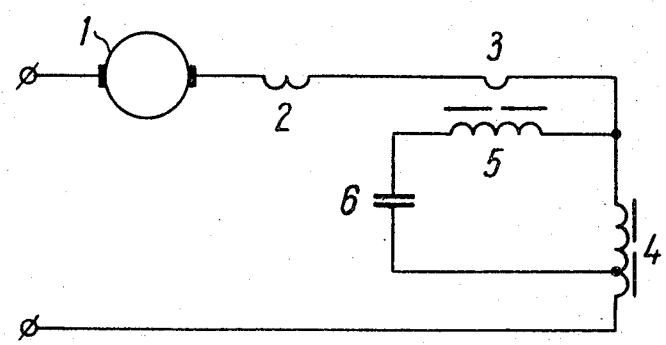
FIG. 1 shows a device, according to the invention, with an electric capacitance connected in series with the auxiliary winding.

As may be seen from FIG. 1, the device, according to the invention, comprises a direct current electric motor supplied with rectified current which has an armature 1 connected in series with a circuit including a compensating winding 2, winding 3 of the auxiliary poles and an inductive resistance 4. The inductive resistance 4 is connected in parallel with a circuit comprising an auxiliary winding 5 arranged on the cores of the auxiliary poles and an electric capacitance 6 connected in series with the winding 5. The winding 3 of the auxiliary poles and the auxiliary winding 5 are connected accordantly.

The electric capacitance 6 inserted into the circuit of the auxiliary winding 5 provides for obtaining the necessary A.C. phase formed by the pulsation of the alternating current passing through the circuit of the auxiliary winding 5 thus forcing the amplitude and phase of the alternating component of the useful magnetic flux of the auxiliary poles. This is necessary for improving the commutation of the electric motor operating under stable conditions (under constant load).

Figure 2:
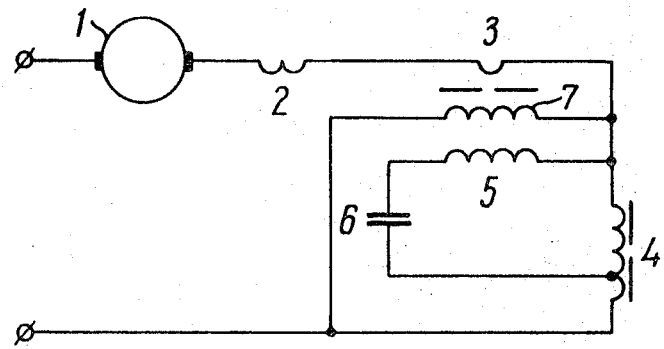
FIG. 2 shows the same device with an additional auxiliary winding.
Figure 3:
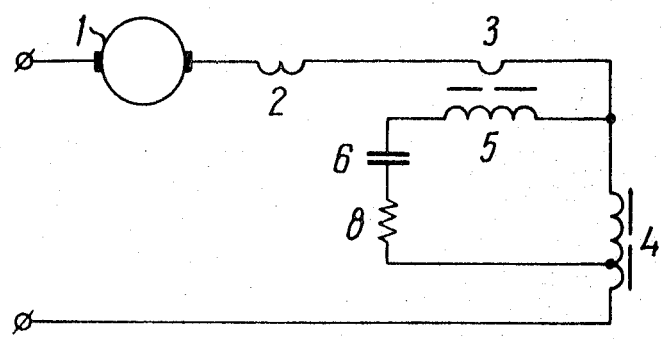
FIG. 3 shows the same device having a resistance connected in series with the electric capacitance.

To improve the commutation of the electric motor operating under fluctuating loads the cores of the auxiliary poles are provided with an additional auxiliary winding 7 (FIG. 2) connected in parallel to the inductive resistance 4 which provides for forcing the excitation of the auxiliary poles. The additional winding 7 is connected accordantly with the auxiliary winding 5 and with the winding 3 of the auxiliary poles.

In order to provide the necessary value of the amplitude of the alternating current a resistance 8 can be connected in series with the electric capacitance 6 in the circuit of the auxiliary winding 5.

What is claimed is:

1. A device for improving commutation of a direct current electric machine having an armature circuit and auxiliary poles with windings supplied with rectified current, said device comprising an inductive resistance connected in series with the armature circuit of said electric machine, an auxiliary winding arranged on the cores of said auxiliary poles and connected in parallel with said inductive resistance, said auxiliary winding being connected accordantly with the winding of the auxiliary poles, and an electrical capacitance connected in series with said auxiliary winding.

2. A device according to claim 5, comprising a pure resistance connected in series with said electrical capacitance.

3. A device acccording to claim 5, in which the cores of the auxiliary poles are provided with an additional auxiliary winding connected in parallel with said inductive resistance, and accordantly with said other auxiliary winding.

References Cited

UNITED STATES PATENTS

| | | | |
|---|---|---|---|
| 2,800,598 | 6/1957 | Whitcroft | 310—220 |
| 2,989,653 | 6/1961 | Wengel | 310—220 |
| 3,201,626 | 8/1965 | Calabrese et al. | 318—439 |

ORIS L. RADER, Primary Examiner

K. L. CROSSON, Assistant Examiner

U.S. Cl. X.R.

310—220; 318—492